Patented July 10, 1945

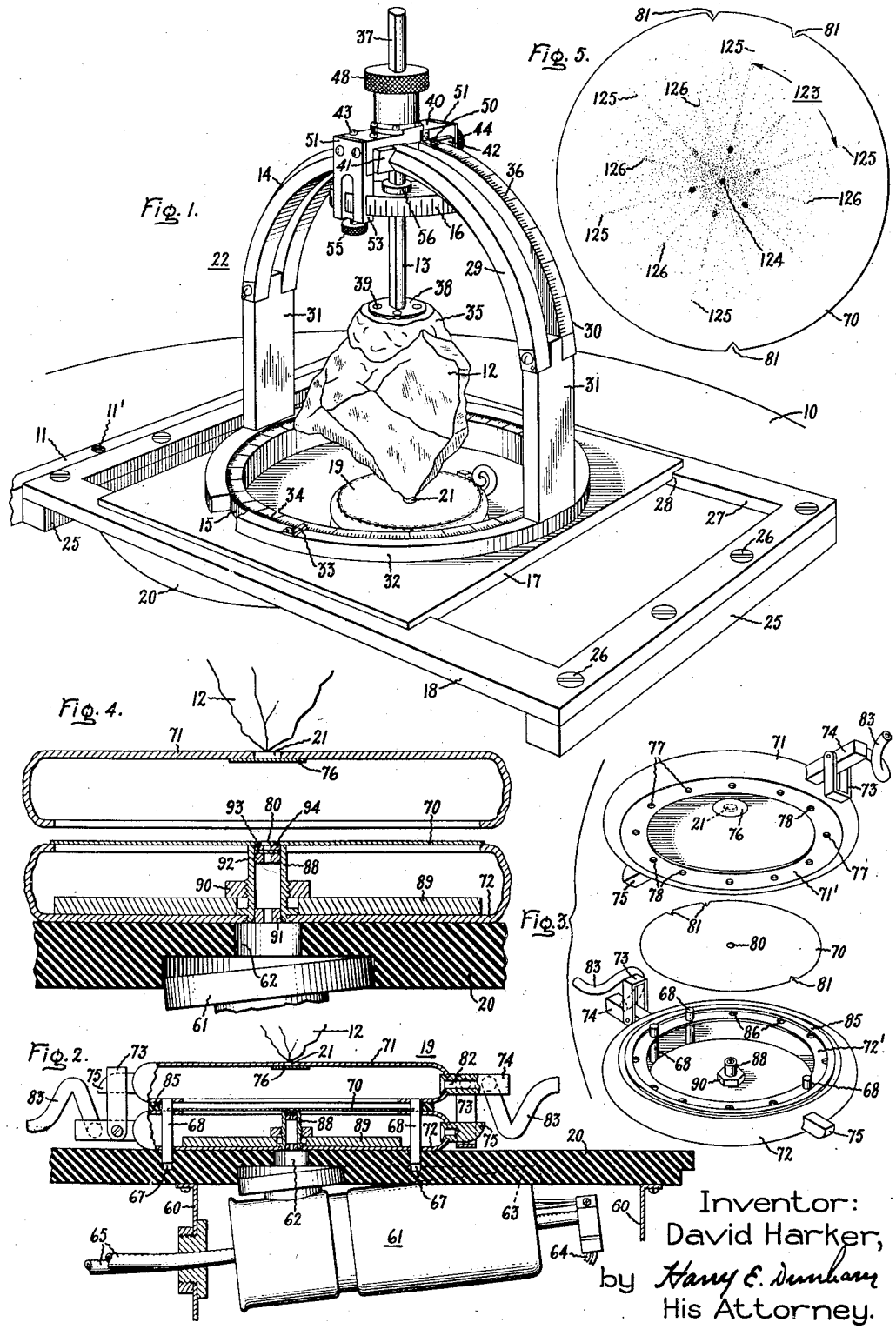

2,380,236

UNITED STATES PATENT OFFICE 2,380,236

X-RAY CAMERA

David Harker, Alplaus, N. Y., assignor to General Electric Company, a corporation of New York Application June 5, 1943, Serial No. 489,791

13 Claims. (Cl. 250—53)

My invention relates to apparatus for examining crystalline substances with the aid of X-rays and in particular to cameras for use in such apparatus.

It is known that, when X-rays are reflected from the surface of a crystal, diffraction of the X-rays occurs and a definite diffraction pattern is formed whose configuration depends on the nature of the crystalline substance and the angle of incidence of the X-ray beam. When such reflected rays are intercepted by a sensitized film and the film developed, a permanent record of the diffraction pattern of the crystal may be obtained. Such a pattern is extremely useful, not only for determining the nature of a crystalline substance, but also for determining precisely the directions of certain axes of the individual crystals.

It is an object of my invention to provide an improved camera for recording an X-ray diffraction pattern.

In the manufacture of piezo-electric crystal oscillators for radio transmitters and similar uses, it is customary to use the natural faces of the crystals as a means for orienting the crystals for cutting. Where the crystal is irregular in shape and has no natural faces, however, it is necessary to resort to other means for orientation of the crystal. One such means is the X-ray diffraction pattern of the crystal. It is an object of my invention to provide an improved camera for recording diffraction patterns of X-rays reflected from an irregular crystal.

Another object of my invention is to provide an improved camera for recording backwardly reflected X-ray diffraction patterns of piezo-electric crystals.

Another object of my invention is to provide an improved X-ray camera which includes means for collimating a beam of X-rays.

A further object of my invention is to provide an improved X-ray diffraction pattern camera which includes film orienting means to assist in analyzing a recorded pattern.

Still another object of my invention is to provide an improved X-ray diffraction pattern camera so constructed that the photo-sensitive film used may be developed within the camera itself.

The features of my invention which I believe to be novel are set forth with particularity in the appended claims. My invention itself, however, both as to its organization and method of operation, together with further objects and advantages thereof, may best be understood by reference to the following description taken in connection with the accompanying drawing, in which Fig. 1 is a perspective view of certain portions of my crystal orienting apparatus; Fig. 2 is an elevation view, partly in section, of the source of X-ray and the camera used in Fig. 1; Fig. 3 is an exploded view of the camera shown in Fig. 2; Fig. 4 is an enlarged view of the collimating system of the camera of Fig. 2; and Fig. 5 shows a typical diffraction pattern obtained with the apparatus of Fig. 1. In the several views, corresponding numerals have been used to designate corresponding parts to facilitate their comparison.

Referring to Fig. 1, I have shown apparatus for obtaining a back reflection X-ray diffraction pattern of a quartz crystal which comprises a suitable working surface or table top 10, upon which is mounted a rectangular bar 11, of steel or any other suitable material, for defining a standard direction and secured thereto by any suitable means, such as the screws 11'. A crystal 12 to be oriented is supported by a rod 13 from a crystal goniometer 22 which comprises an inclination semi-circle 14, an azimuth circle 15, and a rotation circle 16. The inclination semi-circle 14 is mounted for rotation about the azimuth circle 15. The azimuth circle 15 is formed integrally with a plate 17 which is adjustably supported upon rectangular frame member 18 slidable along the reference bar 11.

The quartz crystal orienting apparatus shown in Fig. 1 is more specifically described and claimed in my copending application, Serial No. 489,790, filed June 5, 1943 and assigned to the same assignee as the present invention.

A camera 19, located in a predetermined position on a non-metallic insert 20 in the table top 10, has a central opening 21 above which the lowermost point of the crystal 12 may be positioned.

The crystal goniometer 22 is an arrangement whereby the crystal mounted on the rod 13 can be easily set at any desired angular orientation with respect to the back reflection camera 19. The frame 18, by sliding along the reference bar 11, allows translation of the crystal without changing its angular orientation. The angular variables of the goniometer are the angles of the rotation of the mounting rod 13 about its own axis, which angle is adjusted by means of the rotation circle 16; the inclination of the mounting rod to the perpendicular of the table top, which angle is adjusted by means of the inclination semi-circle 14; and the azimuth of a projection of the mounting rod 13 on the table top 10, which is adjusted by rotation of the goniometer 22 about the azimuth circle 15.

The frame 18 comprises an accurately machined rectangular member supported by legs 25 and secured thereto by means of the screws 26. The frame's left-hand edge is abutted against the reference bar 11 so that the longer legs of the frame are exactly perpendicular to this reference bar. The frame 18 has an inner bearing surface 27 along which cooperating shoulders 28 on the plate member 17 may slide. By sliding the frame 18 along the straight edge 11 and the plate 17 bearing the azimuth circle 15 up and down the inner bearing surface of the frame, the center of the azimuth circle may be placed in various positions without changing the orientation of its reference radius with respect to the straight edge 11. This allows the lowest point of the crystal 12 to be brought over the opening 20 of the camera 19 in a manner which will be described later.

The inclination semi-circle 14 consists of two parallel semi-circular slides 29, 30 supported in a vertical plane by two vertical columns 31, each of which is attached to one end of both of the semi-circles. The two columns 31 are fastened at their lowermost ends to a horizontal steel ring 32 which fits over the outer bearing surface of the azimuth circle 15. This ring carries a marker 33, by means of which the azimuth of the plane of the semi-circle can be read on the graduated azimuth circle scale 34. The upper surface of the semi-circle slide 30 carries a scale 36 graduated in degrees so that the inclination of the mounting can be read thereon in a manner to be explained later. The crystal mounting rod 13 is milled off flat on one side 37 and carries a disk 38 at its lowermost end through which are drilled several holes 39. In use, the disk is coated with some convenient adhesive material 35, such as cement, and is brought into contact with the crystal, also coated with a suitable cement, so that the approximate optical axis of the crystal, determined in a manner to be explained later, is parallel to the rod. The cement is then allowed to set.

A supporting and clamping structure for the crystal mounting rod 13 comprises a movable frame member 40, supported from the inclination semi-circles 29, 30 by means of a pair of block members 41, 42 having V-shaped bearing surfaces for engaging the outer edges of the semi-circles 29, 30. The block member 41 is secured to the frame member 40 by means of screws 43, while block member 42 is movably supported from frame member 40 by means of knurled adjusting screw 44. By tightening the knurled screw 44, the frame member 40 may be held to one position on the inclination semi-circle. The knurled nut 48 surrounds a split chuck (not shown) which is tightened by means of threads on the inside of nut 48 to clamp the rod 13 in a fixed position.

It may be observed that, as the frame member 40 and the bearing blocks 41 slide on the vertical semi-circles 29, 30 of the inclination semi-circle, the crystal mounting rod 13 is supported parallel to a radius of the semi-circle in all positions. Frame member 40 also carries a marker 50, by means of which the angle of inclination of the mounting rod to the perpendicular of the table top 10 may be read on a graduated scale 36.

Also supported from the frame member 40 at its opposite ends are two depending members 51 having inwardly extending fingers 53 which serve as means for supporting the rotational circle 16. A knurled screw 55, passing through finger 53, serves as means for clamping the rotational circle in a fixed position. The rotation circle 16 has a central bore 56 which is keyed to the crystal mounting rod 13 to prevent turning of the rod with respect to the rotation circle 16, but allows longitudinal motion of the rod through this bore. In this way, rod 13 can slide freely upwardly or downwardly for adjustment purposes. The fingers 53 prevent rotation circle 16 from moving upwardly with respect to the frame member 40. When the rotation circle is set to a desired position, the thumb screw 55 provides means for clamping the rotation circle to prevent further rotation of the rod without, however, affecting the longitudinal freedom of motion of the rod, this movement being controlled by the split chuck within the knurled nut 48. The rotation circle 16 is graduated in degrees around its outer surface and the depending member 51 is provided with a cooperating marker (not shown) for indicating the angle of rotation of the mounting rod 13.

In Fig. 2, there are shown the source of collimated X-ray beam and the back reflection X-ray diffraction camera. The non-metallic plate 20, previously mentioned, which may be composed of any suitable insulating material, such as a molded phenolic resin, serves as means for supporting a metallic tank 60 in which is located a suitable X-ray tube 61 whose longitudinal axis is inclined at a small angle to the plane of the plate 20 so that an intense vertical X-ray beam is directed through a hole 62 in the plate 20. The plate 20 is provided on its lower surface with a groove 63 to allow the X-ray tube 61 to be tilted to this angle. The tank 60 may be filled with oil or any suitable insulating material. The tube 61 may be supplied with operating potential through lead 64 and may be cooled by water circulated in tubes 65. The upper surface of the dielectric plate 20 is provided with three holes 67 which serve as means for locating three pins 68 attached to the back reflection camera so that this camera is centered in the X-ray beam and oriented with respect to the standard direction defined by the metal straight edge 11 shown in Fig. 1.

The purpose of the back reflection X-ray diffraction camera 19 is to record on a photographic film 70 the X-rays diffracted from the surface of the quartz crystal when a collimated beam of X-rays impinges upon it. Rays which are diffracted in a more or less forward direction are absorbed by the crystal, while rays that are diffracted in a direction near that from which the primary X-ray beam comes are the only ones reliably available for recording. Accordingly, the camera 19 is provided to record back reflected X-rays.

The camera 19 comprises two shallow receptacles or shell-like members 71 and 72 of any suitable material, such as spun copper or a suitable molded phenolic resin. The two shells are clamped together by means of latches 73, each of which is mounted on a latch yoke 74 of a respective one of the shells and engages a cooperating stud 75 on the other shell.

As may be seen in the exploded view of the camera 19 shown in Fig. 3, the upper shell 71 is pierced by the centrally located hole 21 which is covered on the inside of the shell by a thin piece 76 of aluminum foil or any other suitable material which is transparent to and does not absorb back reflected X-rays. The shell 71 has an inwardly extending flange or rim 71' which is pierced by a plurality of holes 77, each of which is located the same radial distance from the center of the shell 71, and by three holes 78, located at a radial distance from the center of the shell 71 different from that of the holes 77. The holes 78 are spaced to receive the three locating pins 68 carried by the lower shell 72 and extending upwardly into the holes 78 and downwardly into the holes 67 of plate 20. The film 70, which is circular in shape and is provided at its center portion with a centering hole 80, is provided at its outer periphery with three notches 81 whose positions correspond to those of the pins 68. It is seen, therefore, that the pins 68 serve to locate the upper shell with respect to the lower shell, to locate, orient and center the film 70, and to locate, orient and center the entire camera with respect to the X-ray beam.

The latch yokes 74 which carry the latches 73 have a central bore 82 which continues as a helical tube 83 protruding from the side of the shell opposite the stud 75. A gasket 85 of suitable material, such as neoprene, is cemented to the inwardly extending flange or rim 72' of the lower shell 72, outside of the holes 86, which correspond to and are aligned with the holes 77 in the upper shell 71, and serves to make the joint between the shells light and watertight.

The collimating system, an enlarged view of which is shown in Fig. 4, consists of a tube 88 of any suitable material, such as brass, riveted into a hole in the center of the lower shell 72 and extending up to the level of the inner rim of this shell. A lead X-ray protection sheet 89 is located on the inner surface of the lower shell 72 surrounding the tube 88 and is held in place by nut 90 which engages external threads on tube 88. Inside the tube 88 are two metal inserts 91 and 92, formed preferably from type metal, which are drilled with centrally located holes. The top insert 92 is covered by a thin sheet of aluminum foil 93 which is held in place by a thin metal disk 94 having a small centered aperture. The two metal inserts 91, 92 and the metal disk 94 may be secured to the inner surface of tube 88 in any suitable manner, such as by soldering. The upper surface of the disk 94 is flush with the top of tube 88 and with the upper surface of the inner rim of the lower shell, the pieces of aluminum foil 93 and 76 serving to make the collimating system light and watertight, while at the same time allowing X-rays to pass.

The common center line of the holes in the metal inserts 91 and 92 is perpendicular to the plane of the inner rim of the lower shell and passes through the center of the circle on which the locating pins 68 are fixed. The film 70, when in place in the camera, is centered by the locating pins 68 so that the center hole 80 is concentric with the axis of the collimating system. It is apparent that the locating pins 68 and the notches 81 do not fit together unless the film is in the one correct orientation, which orientation is permanently marked on the film by the notches 81. The film, of course, is placed in the camera 19 in a dark room. After the flange portions 71', 72' are placed in opposed relation and oriented so that the locating pins 68 fit in holes 78 and the shells 71 and 72 are clamped together by the latches 73, the camera may be exposed to stronger light without damage to the film, the helical tubes 83 serving as light traps to prevent the entrance of light through the bores 82.

After the film is exposed, the tubes 83 serve as means to introduce developer into the camera in which it may be allowed to remain for a proper development time, the aligned holes 77 and 86 permitting passage of fluids between the shells 71, 72. The developer is then removed and first, washing water, and subsequently, fixer, introduced by the same tubes. Thus, with the exception of loading, no dark room is required for producing a picture of the diffraction pattern. Preferably, when the developer is introduced, the camera is held in a vertical position so that the latches 73 are one above the other and the developer is forced into the lower tube 83 through a flexible connection until it begins to flow out through the upper helical tube. The developer may be removed through the same flexible connection and water and fixer, in sequence, may be introduced in the same manner.

In the operation of the crystal orienting apparatus thus described, the optical axis of the irregularly faced crystal 12 is first approximately located by any suitable method, such as by means of polarized light. Such methods are well known in the art and need not be described in detail here. It may be expected that such a determination is correct to 30° or less. Thereafter, the crystal is cemented to the holder 13 with this approximate optical axis direction lying parallel to the longitudinal axis of a mounting rod 13. The mounting rod 13 is placed within the goniometer 22 and the azimuth circle, the inclination semi-circles, and the rotation circle are all set at their zero points. Thereafter, the crystal 28 is lowered until it touches the upper surface of the shell 71 of camera 19 and is clamped in this position by means of nut 48. By sliding the frame 18 along the straight edge 11 and the plate 17 bearing the azimuth circle along the bearing surface 27 of frame 18, the lowermost point of crystal 12 may be placed directly over the opening 21 in camera 19.

With the camera and quartz crystal thus in position, an exposure is made by energizing the X-ray tube 61, the time of the exposure being determined, of course, by the operating voltage, the space current, and the characteristics of the tube employed. The camera 19 may then be removed from the orienting apparatus and the film developed and fixed without removing from the camera.

The back reflection X-ray diffraction pattern of a crystal consists of an array of spots which can be thought of as being reflections of the primary X-ray beams from the various crystallographic planes. In a quartz crystal, these planes are parallel to planes which cut two of the electrical axes and the optical axis at predetermined distances from the common intersection. If the optical axis is parallel to the primary X-ray beam, the diffraction pattern consists of six identical wedge-shaped regions with their points meeting at the center. In Fig. 5, reference numeral 123 designates one of these six identical wedge-shaped regions and the center is designated by the numeral 124. In this figure, the center of the pattern coincides with the central aperture in the film. The dividing lines, such as the line 125, between these regions are marked by straight lines densely strewn with rather intense spots. The pattern on one side of each of these dividing lines is a mirror image of the pattern on the other. These dividing lines are composed of reflections from crystal planes of a certain type, included among which are the major and minor pyramids of the crystal structure. Bisecting the angle between two neighboring dividing lines 125, is a less strongly marked line of spots, such as the line 126, which dies off in intensity toward the center of the pattern. These two sets of lines, the strongly marked lines 125 which are reflection lines of the symmetry of the pattern and the weakly marked lines 126 which are not, are referred to in the following discussion as the hexagonal cross of the pattern. It is by means of this hexagonal cross that the orientation of the quartz crystals is determined in the method now being described. Fig. 5 shows a diffraction pattern from a quartz crystal with its optical axis parallel to the X-ray beam on which the hexagonal cross appears as just described.

If one imagines a quartz crystal to carry with it a set of six planes intersecting along the optical axis at angles which are multiples of 30° to one another so that they parallel the mechanical and electrical axes, the hexagonal cross in the diffraction pattern discussed above is the same as the pattern where these planes cut the film 70. Thus, the heavily marked lines 125 are parallel to the mechanical axes of the crystal and the lightly marked lines 126 are parallel to the electrical axes. If the edge of the circular film 70 is divided into degrees, the angle that any one of these axes makes with a set direction can be read.

The film 70 is provided with three notches 81 which fit the locating pins 68 of the camera 19 and whose position with respect to the standard direction defined by the straight edge 11 is known. From these notches, therefore, the angles which any of the electrical or mechanical axes make with the standard direction can be determined.

In order to orient fully the crystal 12 for purposes of cutting, three angles are required; the rotational angle, which is measured by the azimuth on the film of the center of the hexagonal cross; the inclination angle, which is measured by the distance from the center of the film to the center of the hexagonal cross; and the azimuth angle, which is the angle between a line from the center of the film to the center of the cross and the desired arm of the cross. The distance from the center of the film to the center of the hexagonal cross, which is used in measuring the inclination angle, is proportional to the distance between the lowermost point of the crystal 12, when mounted in the goniometer of Fig. 1, and the film 70 within the camera 19. Since, when the crystal is originally placed in position prior to exposure to the X-ray beam, the lowermost point of the crystal is made flush with the top of the shell 71 of the camera 19, if the distance from the top of this shell to the film is, for example, one-half inch, then the value of the distance from the center of the film to the center of the hexagonal cross, in inches, equals ½ tan 2θ. All of the above distances and angles may be measured from the diffraction pattern in any desirable manner. Thereafter, by setting the angles obtained on the corresponding scales 34, 36 and 16 of the crystal goniometer 22, the crystal is oriented with its optical axis vertical and its selected mechanical axis almost exactly parallel to the standard position defined by the straight edge 11. When the crystal is oriented to this position, it may be cemented to a mounting plate prior to cutting.

From the foregoing, it may be seen that my invention provides an improved camera for the study of crystalline substances. From the back reflected X-ray diffraction patterns obtained by this camera, the optical and electrical axes of a quartz crystal, for example, may be determined with a high degree of precision. In the use of a camera of the type described for orienting a large number of quartz crystals, it was found that when oriented in the manner outlined above the optical axis and the pyramid faces of the crystal were determined with precise accuracy in all instances.

While I have shown a preferred embodiment of my invention, it will of course be obvious that many modifications may be made. Thus, for example, while I have described my camera as being employed for obtaining back reflection X-ray diffraction patterns, it will be apparent that the features thereof are capable of numerous other applications. It will be understood, therefore, that I do not wish to be limited to the particular embodiment shown since various modifications may be made and I contemplate by the appended claims to cover any such modifications as fall within the true spirit and scope of my invention.

What I claim as new and desire to secure by Letters Patent of the United States is:

1. A back reflection X-ray camera comprising a light impervious body member having a wall transparent to X-rays and adjacent which an object to be examined is placed, a substantially flat film supported within said body member in a plane substantially parallel with said wall, and means to project a collimated beam of X-rays transversely through said film and wall onto said object whereby said X-rays are reflected back on said film to form a figure thereon dependent on the character of said object.

2. In an X-ray camera of the back reflection type having a wall having an aperture therein transparent to X-rays and adjacent which an object to be examined is placed, a substantially flat film positioned in said camera at a distance from said aperture, and means to project a beam of X-rays through said film and aperture onto said object to be examined whereby said X-rays are reflected back on said film to form a figure thereon dependent on the character of said object.

3. In an X-ray camera of the back reflection type having a wall having an aperture therein transparent to X-rays and adjacent which an object to be examined is placed, a film positioned in said camera at a distance from said aperture, means to project a beam of X-rays through said film and aperture onto said object to be examined whereby said X-rays are reflected back on said film to form a figure thereon dependent on the character of said object, and means to inject developing fluid into said camera to develop said film while in said camera.

4. In an X-ray camera of the back reflection type having a wall having an aperture therein transparent to X-rays and adjacent which an object to be examined is placed, a substantially flat film positioned in said camera at a distance from said aperture and having an aperture therein in alignment with said first aperture, means to project a beam of X-rays through said apertures onto said object to be examined whereby said X-rays are reflected back on said film to form a figure thereon dependent on the character of said object.

5. A back reflection X-ray camera comprising a light impervious body member having a wall transparent to X-rays and adjacent which an object to be examined is placed, a substantially flat film supported within said body member in a plane substantially parallel with said wall and at a predetermined distance from said wall, and means to project a collimated beam of X-rays transversely through said film and wall onto said object whereby said X-rays are reflected back on said film to form a figure thereon dependent on the character of said object.

6. A back reflection X-ray camera comprising a light impervious body member having a wall transparent to X-rays and adjacent which an object to be examined is placed, a film supported within said body member in a plane substantially parallel with said wall, means to project a collimated beam of X-rays transversely through said film and wall onto said object whereby said X-rays are reflected back on said film to form a figure thereon dependent on the character of said object, and means whereby developing fluid may be injected into said body member to develop said film while in said member.

7. An X-ray camera of the back reflection type comprising, a light impervious body member having a wall transparent to X-rays and adjacent which an object to be examined is placed, means for supporting a substantially flat film within said body member in a plane substantially parallel with said wall, and means within said body member to collimate a beam of X-rays projected through said body member on said object along a path transverse to said film and said wall to produce a back reflection diffraction pattern on said film.

8. An X-ray camera comprising a pair of shell-like members, means for retaining said members in fixed relation to form a light-tight enclosure, means for supporting a photo-sensitive film within said enclosure, and means within said enclosure for collimating a beam of X-rays projected through said members.

9. An X-ray camera comprising a pair of shallow receptacles, each of said receptacles being formed of light impervious material and having an inwardly directed flanged portion, means for securing said receptacles together with said flanged portions in opposed relation whereby a light-sensitive film may be supported therebetween, and means positioned between said receptacles for collimating a beam of X-rays projected through said receptacles.

10. An X-ray camera for recording a back reflected X-ray diffraction pattern comprising, a pair of shell-like members of light impervious material, each of said members having an inwardly extending flange portion, means for locking said members in a predetermined position with said flange portions in opposed relation to form a light-tight enclosure, a light-sensitive film supported between said opposed flange portions, said film having a central aperture, and a collimating system for an X-ray beam located between said members in alignment with said aperture.

11. An X-ray camera comprising a pair of circular light impervious shell-like members, each of said members having an inwardly directed flange portion, a plurality of spaced locating pins supported by the flange portion of one of said members, the other of said flange portions having a plurality of holes therethrough whose spacing corresponds to the spacing of said pins, means for securing said receptacles together with said flange portion in opposed relation, and a circular light-sensitive film supported between said flange portions, said film having a plurality of notches about its periphery whose spacing corresponds to the spacing of said pins and whereby a pattern produced on said film may be oriented.

12. An X-ray camera comprising a pair of shallow receptacles, each of said receptacles being formed of light impervious material and having an inwardly directed flanged portion, means for latching said receptacles together with said flanged portions in opposed relation whereby a light-sensitive film may be supported therebetween, said latching means including a pair of tubular members whereby developing fluids may be introduced into said receptacles, said tubular members having a curved portion to prevent the entry of light into said camera, and said flanged portions having holes therethrough to permit circulation of said fluids between said receptacles and about said film.

13. An X-ray camera comprising a pair of shell-like members of light impervious material, means including a plurality of spaced locating pins extending through one of said members for securing said members in a predetermined relation to form a light-tight enclosure, means for supporting a light-sensitive film within said enclosure, said film having a plurality of holes therethrough whose spacing corresponds to the spacing of said pins and whereby a pattern produced in said film may be oriented, and means within said enclosure for collimating a beam of X-rays projected through said members.

DAVID HARKER.